United States Patent [19]

Takahashi

[11] Patent Number: 5,792,492
[45] Date of Patent: Aug. 11, 1998

[54] OPTICAL DISK MOLDING APPARATUS EQUIPPED WITH LIQUID SEALING MEANS

[75] Inventor: Mitsuo Takahashi, Matsudo, Japan

[73] Assignee: Seikoh Giken Co., Ltd., Chiba-Ken, Japan

[21] Appl. No.: 764,605

[22] Filed: Dec. 11, 1996

[30] Foreign Application Priority Data

Jul. 5, 1996 [JP] Japan ................................ 8-195342

[51] Int. Cl.⁶ ........................................................ B29C 45/73
[52] U.S. Cl. .................. 425/547; 264/106; 264/328.16; 277/167.5; 277/236; 425/407; 425/552; 425/810; 425/DIG. 47
[58] Field of Search ........................... 425/547, 552, 425/384, 407, 810, DIG. 47, DIG. 110, DIG. 246; 264/328.16, 107, 106; 277/167.5, 236, 168

[56] References Cited

U.S. PATENT DOCUMENTS

| | | | |
|---|---|---|---|
| 3,941,547 | 3/1976 | Hunyar et al. | 425/407 |
| 4,260,360 | 4/1981 | Holmes et al. | 249/79 |
| 4,462,780 | 7/1984 | Stavitsky et al. | 425/810 |
| 4,550,921 | 11/1985 | Smith | 277/236 |
| 4,731,206 | 3/1988 | Schubert | 249/78 |
| 4,737,096 | 4/1988 | Poorten | 425/810 |
| 4,771,832 | 9/1988 | Bridges | 277/236 |
| 4,801,068 | 1/1989 | Graczoll et al. | 249/79 |
| 5,058,906 | 10/1991 | Adamek et al. | 277/236 |
| 5,215,316 | 6/1993 | Udagawa | 277/236 |

*Primary Examiner*—Jay H. Woo
*Assistant Examiner*—Joseph Leyson
*Attorney, Agent, or Firm*—Spencer & Frank

[57] ABSTRACT

An optical disk molding apparatus is provided which includes a fixed side mold assembly and a movable side mold assembly. Each mold assembly has a mounting plate, a disk cavity plate, a temperature control liquid passage, and a temperature control liquid sealing device. The temperature control liquid sealing device is comprised of at least one annular aperture formed between the mounting plate and the disk cavity plate around the inner or the outer circumference of the temperature control liquid passage in each of the mold assemblies, a rigid ring fitted within the annular aperture such that there is only a minute clearance between the inner wall of the annular aperture and the rigid ring, and a heat resistant sealing filler charged between the inner wall of the annular aperture and the rigid ring.

8 Claims, 3 Drawing Sheets

OPTICAL DISK MOLDING APPARATUS EQUIPPED WITH LIQUID SEALING MEANS

BACKGROUND OF THE INVENTION

1. Field of the Invention

The present invention relates to a mold apparatus for molding optical disks. The mold apparatus has a sealing means for preventing the leakage of hot water for controlling the temperature of a fixed side mold assembly or a movable side mold assembly.

2. Description of the Related Art

There is an injection molding apparatus for digital video disks (DVDs), magneto-optical (MO) disks, etc., wherein the temperature of the mold must be maintained at high temperatures of 100 to 140 degrees centigrade.

FIG. 4 is a schematic sectional view illustrative of a known injection mold for optical disk substrates; the injection mold is in a clamped state. In the drawing, one surface of a fixed side disk cavity plate 1 is provided with concentric channel grooves 2 through which hot water for controlling the mold temperature circulates, and grooves 5 and 6 in which O-rings 3 and 4 are fitted for preventing the hot water from leaking out and which are provided in the inner circumferential section and the outer circumferential section thereof. A fixed side mounting plate 7 is provided with a hot water supply port 8, a draining port 9, and a sprue bush 10 through which melted resin material is injected at the center thereof. The outside diameter of the optical disk substrate is defined by a ring mold member 11 provided on the fixed side disk cavity plate 1. The fixed side disk cavity plate 1 and the fixed side mounting plate 7 are assembled with a plurality of mounting bolts 12 to constitute a fixed side mold assembly A.

Further, one surface of a movable side disk cavity plate 13 is provided with concentric channel grooves 14 through which hot water for controlling the mold temperature circulates, and grooves 17 and 18 in which O-rings 15 and 16 are fitted for preventing the hot water from leaking out and which are provided in the inner circumferential section and the outer circumferential section thereof. A stamper plate 20 with signals engraved thereon is provided on the other surface of the movable side disk cavity plate 13 by a mounting bush 19. A cutting punch 21 is used for boring the central hole in the optical disk substrate. A movable side mounting plate 22 is provided with a hot water supply port 23 and a draining port 24. The movable side disk cavity plate 13 and the movable side mounting plate 22 are assembled with a plurality of mounting bolts 12A to constitute a movable side mold assembly B.

The molding operation performed by the mold is as follows: in the clamped state shown in FIG. 4, the melted resin material, which has been melted by heating to 300 degrees centigrade or more, is charged through a nozzle aperture of the sprue bush 10 under high pressure into a cavity 24 formed by the respective disk cavity plates 1 and 13. The minute signal pattern of the stamper plate 20 is transferred onto an optical disk substrate surface. The central hole is bored. Then the movable side mold assembly B is withdrawn to open the mold, and the molded optical disk substrate is removed from the mold.

In a typical optical disk, minute signals of a track pitch of 1.6 μm, a width of 0.8 μm, and a depth of 0.4 μm must be accurately transferred from the stamper plate to a surface of the substrate of the optical disk. For this reason and for achieving better transferring performance, the injection mold for optical disks is set at a higher mold temperature than a general resin injection mold. For example, in the case of the DVD or ROM optical disks, it is considered necessary to maintain the mold temperature at about 130 to about 140 degrees centigrade. Accordingly, the temperature of the hot water for controlling the mold temperature ranges from 130 to 140 degrees centigrade. The hot water of 140 degrees centigrade changes from a liquid phase to a water vapor phase of 3.685 kgf/cm$^2$ in pressure, adversely affecting the heat transfer between mold wall surfaces; therefore, the hot water must be circulated in the liquid phase. This requires that a pressure of 7 to 8 kgf/cm$^2$ be applied beforehand so that the hot water may be circulated forcibly through the channel grooves.

The inventor has carried out the aforesaid molding operation by using the Injection molding apparatus for optical disk substrates shown in FIG. 4 to study the operation of each section, especially the durability of the O-rings. The fixed side O-rings 3 and 4 for preventing the leakage of the hot water in the apparatus are subjected to hot water of high temperatures which flows through the very small clearance between the surfaces of the disk cavity plate 1 and the mounting plate 7. The same applies to the movable side O-rings 15 and 16.

As shown in FIG. 5, the O-ring 15 of the apparatus known in the prior art is pressed against a surface of the fitting groove by the hot water pressure and plastically deformed. The cross-sectional shape of the O-ring 15 becomes rectangular. Generally, O-rings are less resistant to hot water vapor; therefore, hotter water accelerates the deterioration of the O-rings. It has been observed that, as the O-rings deteriorate, they become nonelastic, hardened and fragile until they finally lose their sealing ability. The optical disk substrate mold employing O-rings as the means for sealing the hot water has an advantage in that the simple structure thereof permits easy manufacture; however, it has a serious drawback in maintenance and control in that the O-rings need to be frequently replaced.

As an alternative, to obviate the use of O-rings, the groove surfaces of the disk cavity plate and the mounting plate have been connected by silver soldering. The silver soldering requires an operating temperature of approximately 700 degrees centigrade; therefore, the disk cavity plate and the mounting plate must be heated to that temperature.

It is important to provide a disk cavity plate with wear resistance; therefore, a typical disk cavity plate uses SUS440C type martensite stainless steel which has been subjected to heat treatment and the plate is further provided with a coating. More specifically, SUS440C type martensite stainless steel is heated to approximately 1100 degrees centigrade, quenched to harden it, and then tempered at about 500 to 515 degrees centigrade to refine it to a hardness of H$_R$C 58 to 60. After that, the cavity surface is provided with Ti—N coating to generate a cured film having a hardness ranging from MHv 1800 to 2000.

The SUS440C type martensite stainless steel has a temperature characteristic such that its hardness suddenly drops when the tempering temperature rises higher than 550 degrees centigrade and, at the operating temperature of about 700 degrees centigrade for silver soldering, it goes back completely to the hardness before quenching. Hence, the silver soldering must be performed prior to the heat treatment for hardening, presenting the difficulty in manufacture that the disk cavity plates and the mounting plates which have deformed during the hardening process need to be corrected in shape. There has been another serious

3 manufacturing problem in that no correcting means has been available for unevenly silver-soldered portions.

SUMMARY OF THE INVENTION

Accordingly, it is an object of the present invention to provide an optical disk molding apparatus which has improved sealing means for preventing the hot water for controlling the temperature of mold assemblies from leaking out.

To this end, according to the present invention, there is provided an optical disk molding apparatus which is equipped with: a fixed side mold assembly and a movable side mold assembly; a passage for a temperature control liquid which is formed by disk cavity plates and mounting plates of the aforesaid respective assemblies; and temperature control liquid sealing means which is provided around an inner circumference or an outer circumference of the aforesaid temperature control liquid passage; wherein the temperature control liquid sealing means constitutes an annular aperture which is formed between the disk cavity plate and the mounting plate around the inner circumference or the outer circumference of the aforesaid temperature control liquid passage, a rigid ring which is fitted in the aforesaid annular aperture with a minute clearance between them, and a heat resistant sealing filler which is charged between the inner wall surface of the annular aperture and the outer circumference of the rigid ring.

The aforesaid annular aperture may be formed by combining annular grooves which are formed on the disk cavity plate and the mounting plate, respectively.

The aforesaid annular aperture may be provided around the inner and outer circumferences of the aforesaid temperature control liquid passage.

The fitting surface of the aforesaid annular aperture may be provided with a chamfered section.

The aforesaid rigid ring may be a metallic ring.

The aforesaid heat resistant sealing filler may be silicone resin.

DESCRIPTION OF THE PREFERRED EMBODIMENT

Figure 1:
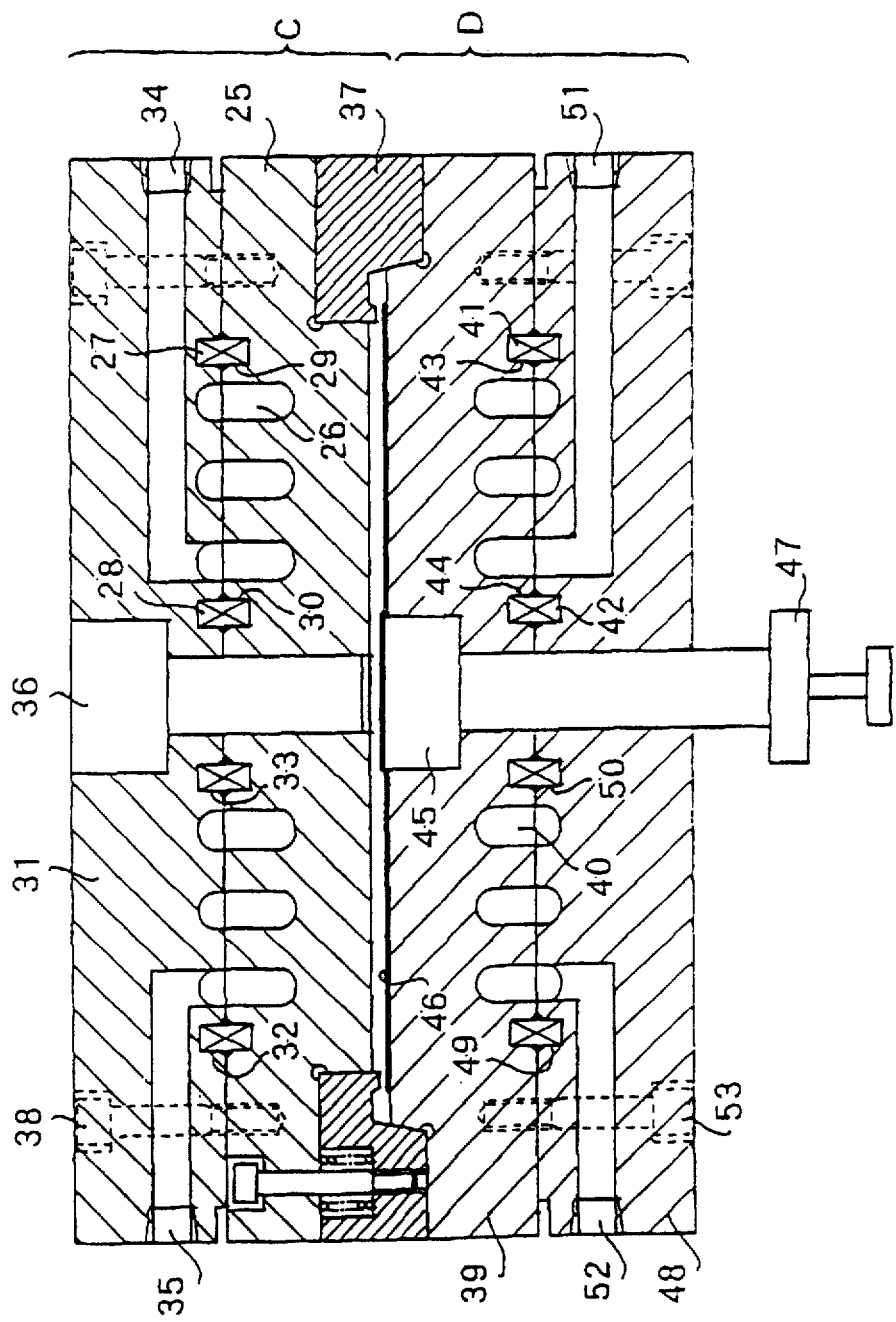
FIG. 1 is a sectional view illustrative of an embodiment of an optical disk molding apparatus in accordance with the present invention.

The present invention will now be described in more detail with reference mainly to the accompanying drawings. FIG. 1 is a sectional view illustrative of an embodiment of an optical disk injection molding apparatus in accordance with the present invention.

4

One surface of a fixed side disk cavity plate 25 is provided with concentric channel grooves 26 through which hot water for controlling the mold temperature circulates, and annular grooves 29 and 30 in which metallic cylindrical rings 27 and 28 are fitted for preventing the hot water from leaking out and which are provided in the inner circumferential area and the outer circumferential area thereof, respectively. One surface of a fixed side mounting plate 31 is provided with annular grooves 32 and 33 in which the metallic cylindrical rings 27 and 28 are fitted.

The fitting surfaces of the annular grooves 29, 30, 32, and 33 are chamfered in a similar way to that shown in FIG. 2 which will be discussed later.

Hot water introduced through a hot water supply port 34 circulates through the concentric channel grooves 26 and drains through a draining port 35. A melted resin material is injected into the mold through the center of a sprue bush 36 for injection. A ring mold member 37 forms the outside diameter of an optical disk substrate.

An appropriate amount of a heat resistant sealing filler such as silicone resin is applied to the respective annular grooves 29, 30, 32, and 33 for the metallic cylindrical rings 27 and 28 of the fixed side disk cavity plate 25 and the fixed side mounting plate 31. Then the metallic cylindrical rings 27 and 28 are inserted therein. The groove surfaces of the fixed side disk cavity plate 25 and the fixed side mounting plate 31 are opposed to each other and brought in close contact. Then they are assembled using a plurality of mounting bolts 38 to constitute a fixed side mold assembly C as illustrated.

One surface of a movable side disk cavity plate 39 is provided with concentric channel grooves 40 through which hot water for controlling the mold temperature circulates, and annular grooves 43 and 44 in which metallic cylindrical rings 41 and 42 are fitted for preventing the hot water from leaking out and which are provided in the inner circumferential area and the outer circumferential area thereof. A stamper plate 46 with engraved signals to be transferred is supported on a cavity surface, i.e. the other surface of the movable side disk cavity plate 39, by a mounting bush 45. A cutting punch 47 is used for punching the central hole in an optical disk substrate. One surface of a movable side mounting plate 48 is provided with annular grooves 49 and 50 for the metallic cylindrical rings 41 and 42, respectively.

The hot water is introduced from a hot water supply port 51 into the concentric channel grooves 40 of the movable side mold assembly and drained through a draining port 52.

Figure 2:
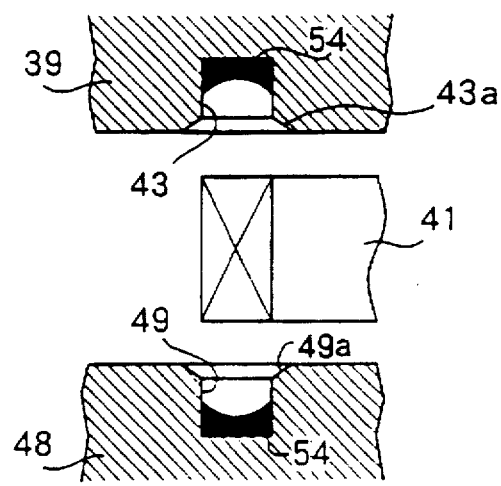
FIG. 2 is an explanatory enlarged view showing an assembly process of a temperature control liquid sealing means of the embodiment.
Figure 3:
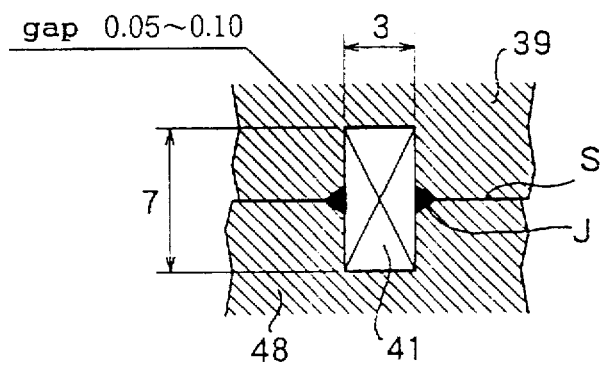
FIG. 3 is an explanatory enlarged view showing the temperature control liquid sealing means of the embodiment which has been completely assembled.
Figure 5:
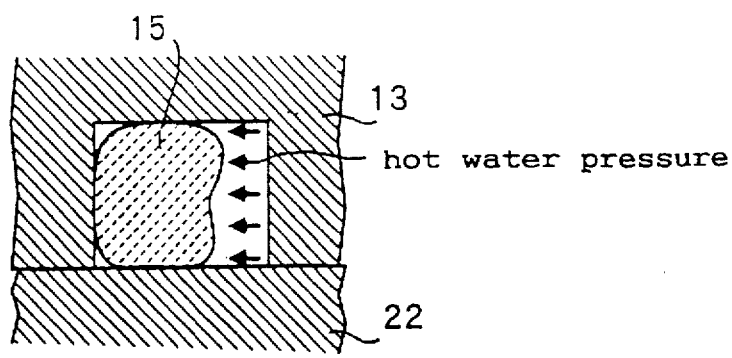
FIG. 5 is an enlarged view illustrating a problem with the temperature control liquid sealing means of the prior art apparatus shown in FIG. 4.

FIG. 2 is an explanatory enlarged view illustrative of an assembly process for assembling the movable side of a temperature control liquid sealing means of the embodiment. Almost the same assembly process applies to the fixed side assembly. FIG. 3 is an explanatory enlarged view illustrative of the temperature control liquid sealing means of the embodiment which has been completely assembled. The annular grooves 43, 44, 49, and 50 for the metallic cylindrical rings 41 and 42 of the movable side disk cavity plate 39 and the movable side mounting plate 48 are provided with, for example, skirted or chamfered sections 43a and 49a on the fitting surfaces thereof as shown in FIG. 2.

An appropriate amount of a heat resistant sealing filler 54, such as silicone resin, is applied to the respective annular grooves 43, 44, 49, and 50 (see FIG. 2). Then the metallic cylindrical rings 41 and 42 are inserted in to the grooves. The grooved surfaces of the movable side disk cavity plate 39 and the movable side mounting plate 48 are opposed to each other and brought in close contact to connect the two plates with a plurality of mounting bolts 53 so as to constitute a fixed side mold assembly D.

Figure 4:
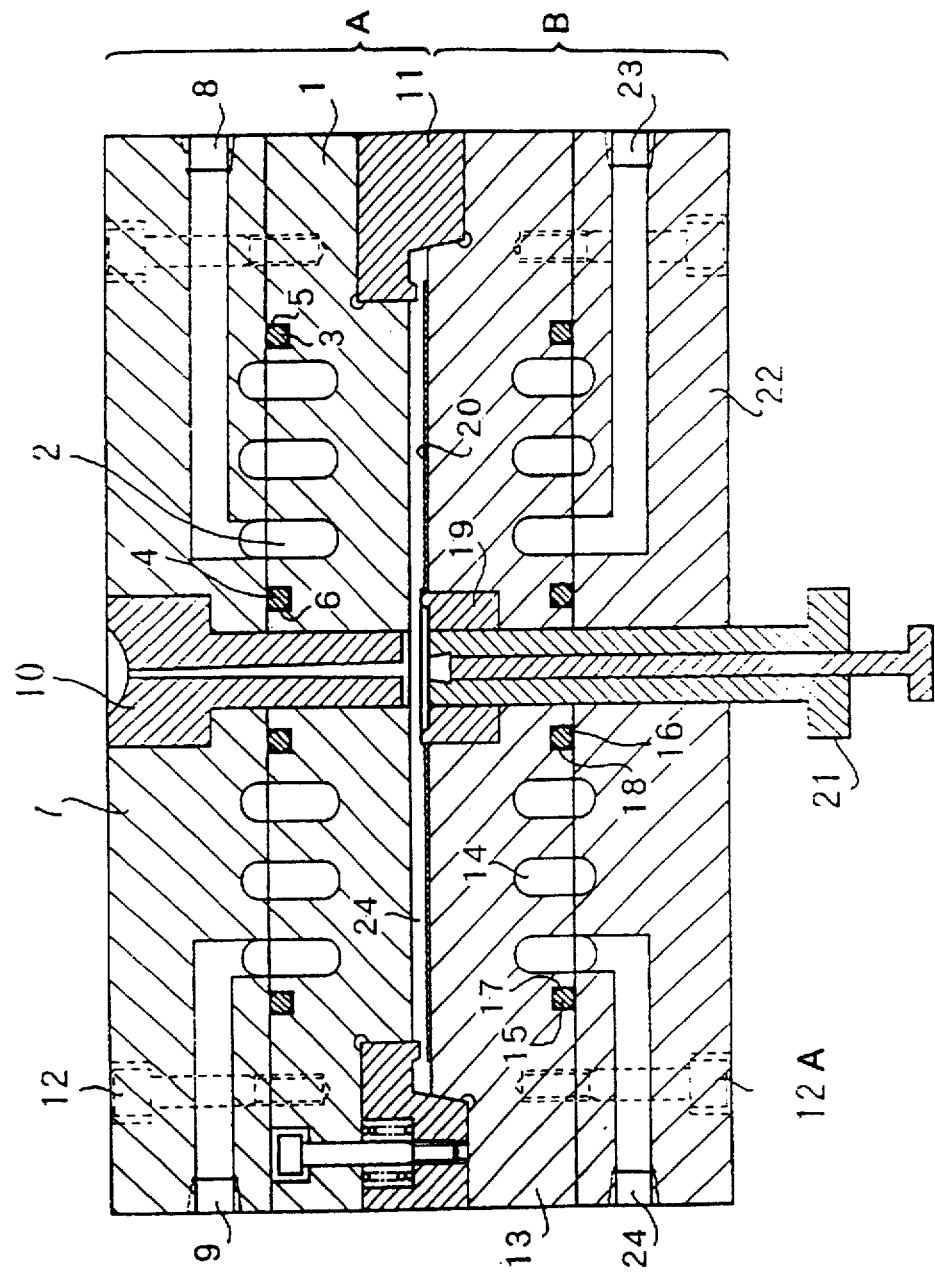
FIG. 4 is a sectional view showing an optical disk molding apparatus known in the prior art which has a temperature control liquid sealing means employing an O-ring.

The description of the basic operation of the molding apparatus will be omitted because it has already been given in conjunction with FIG. 4; the function of the sealing means will be described. As shown in FIG. 3, the hot water pressure from the channel groove 40 passes through a clearance S between the disk cavity plate 39 and the mounting plate 48 and reaches an inner surface J of the metallic cylindrical ring 41. The pressure, however, is received and blocked by the side surface of the metallic cylindrical ring which is highly rigid. It has been found that, if the minute clearances between the metallic cylindrical ring 41 and the fitting grooves 43 and 49 is set to about 0.05 mm to about 0.1 mm and the silicone charging length is set to about 9 mm, then only the inner surface J (see FIG. 3) is deteriorated by the hot water and the remainder of the part filled with silicone is hardly affected when the temperature of the hot water is 140 degrees centigrade, the hot water pressure is 10 kgf/cm$^2$, and the test time is 2000 hours.

As described in conjunction with FIGS. 1, 2, and 3, in the optical disk molding apparatus according to the present invention, the hot water sealing mechanism is designed to receive and block the hot water pressure by the highly rigid metallic cylindrical ring which is inserted and fitted together with the silicone resin sealant in the annular grooves provided on the disk cavity plate and the mounting plate. The hot water is completely sealed by the silicone resin sealant which has been charged in the lengthy fitting clearance. Hence, the optical disk molding apparatus in accordance with the present invention permits easy manufacture because of its simple structure and it also provides high reliability over a prolonged period of time. The optical disk molding apparatus according to the present invention has solved the problem with the experimental example described previously wherein half of the outer circumferential surface of the O-ring deforms due to the hot water pressure applied, causing the sealing function to be easily lost.

The conventional sealing method based on silver soldering described previously causes manufacturing difficulties in that the deformation of the disk cavity plates and the mounting plates has to be corrected; it also has a serious manufacturing difficulty in that no correcting means is available if an unevenly silver-soldered spot results.

The hot water sealing mechanism in accordance with the present invention is free from such manufacturing restrictions or difficulties, providing such advantages as reduced manufacturing cost and shorter required manufacturing time.

Various other modifications of the embodiment which has been described in detail can be made without departing from the spirit and scope of the present invention.

What is claimed is:

1. An optical disk molding apparatus, comprising:

a fixed side mold assembly and a movable side mold assembly, each of said mold assemblies having a mounting plate and a corresponding disk cavity plate;

a first and a second temperature control liquid passage, each having an inner and an outer circumference, said first temperature control liquid passage being provided in said fixed side mold assembly, and said second temperature control liquid passage being provided in said movable side mold assembly;

a first and a second temperature control liquid sealing means, each of said temperature control liquid sealing means having at least one annular aperture, which has an inner wall surface and is formed between said mounting plate and said disk cavity plate around at least one of the inner and the outer circumferences of said temperature control liquid passage in each of said fixed side mold assembly and said movable side mold assembly, a rigid ring having an outer circumference and fitted in said at least one annular aperture such that there is a minute clearance between the inner wall surface of said at least one annular aperture and said rigid ring, and a heat resistant sealing filler charged between the inner wall of said at least one annular aperture and the outer circumference of said rigid ring.

2. An optical disk molding apparatus according to claim 1, wherein each of said disk cavity plates and said mounting plates has at least one annular groove, and said at least one annular aperture is formed by fitting together the at least one annular groove on said mounting plate with the at least one annular groove on said corresponding disk cavity plate at a fitting surface.

3. An optical disk molding apparatus according to claim 2, wherein the at least one annular groove of said disk cavity plate and the at least one annular groove of said mounting plate have chamfered sections at the fitting surface.

4. An optical disk molding apparatus according to claim 1, wherein said at least one annular aperture comprises two annular apertures which are provided around the inner and the outer circumferences of said temperature control liquid passage.

5. An optical disk molding apparatus according to claim 1, wherein said rigid ring is a metallic ring.

6. An optical disk molding apparatus according to claim 1, wherein said heat resistant sealing filler is silicone resin.

7. An optical disk molding apparatus according to claim 1, wherein each of said first and second temperature control liquid passages comprises at least one concentric channel groove.

8. An optical disk molding apparatus according to claim 6, wherein the minute clearance between the inner wall surface of said at least one annular aperture and said rigid ring is substantially between 0.05 mm and 0.10 mm and the charging length of the silicone resin is substantially 9 mm.

* * * * *